J. C. LEE.
Rotary Cotton-Chopper.
No. 228,653. Patented June 8, 1880.
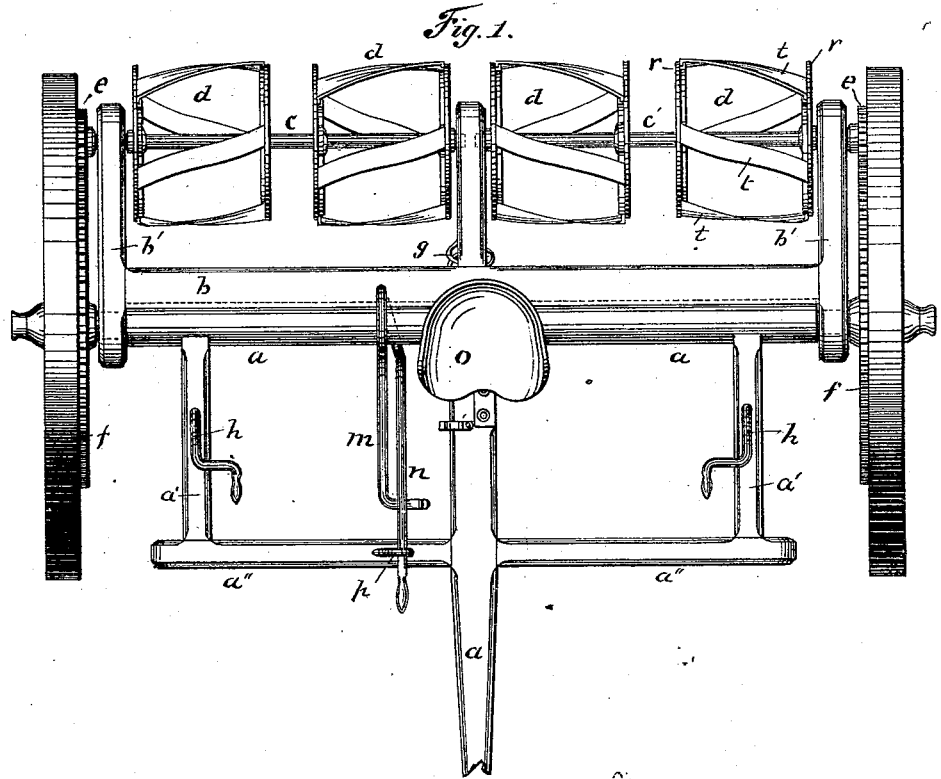
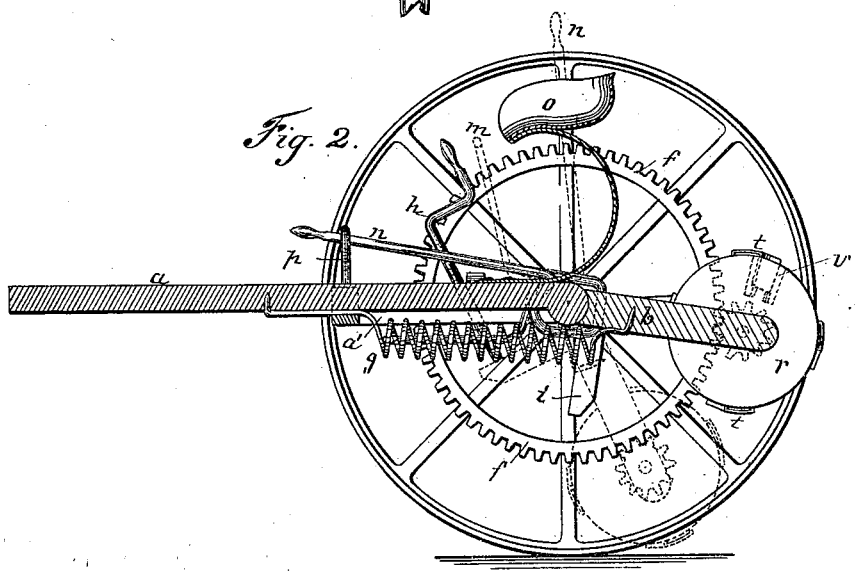
WITNESSES:
INVENTOR:

UNITED STATES PATENT OFFICE.

JOHN C. LEE, OF LADONIA, TEXAS.

ROTARY COTTON-CHOPPER.

SPECIFICATION forming part of Letters Patent No. 228,653, dated June 8, 1880.

Application filed September 13, 1879.

*To all whom it may concern:*

Be it known that I, JOHN C. LEE, of Ladonia, in the county of Fannin and State of Texas, have invented certain new and useful Improvements in Rotary Cotton-Choppers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to the class of cotton-choppers which travel across the rows, and also to the class which use a revolving drum having blades or hoes spirally arranged on its periphery.

The invention consists in the combination of a frame hinged to the axle and provided with two or more drums, with mechanism for rotating them and for raising and lowering them and for adjusting them at any desired elevation, together with certain details of construction, which will be fully understood from the following description and the claim.

Figure 1 is a plan of the machine, and Fig. 2 is a vertical central cross-section.

The frame $a$ of the machine is shown as constructed for two horses. It is a sulky-frame, with seat $o$ for the driver, and has the side pieces, $a'$, and the cross-piece $a''$. $b$ is a swinging frame hung from the axle by the arms $b'$ just within the wheels. It carries the shafts $c\,c'$, each shaft being independent of the other, and provided with two cutting-drums, $d$, and at the outer ends with pinions $e$, which mesh into the cog-wheels $f$ on the wheels.

The spring $g$ is attached at either end to the frame $a''$ of the machine and the swinging frame $b$, for the purpose of holding the drums $d$ down when they are free.

On the under side of the frame $b$ there are two projecting pieces or shoulders, $i$, one near each end of the frame, and passing obliquely through the side pieces, $a'$, there are two long screws, $h$, provided with crank-handles, and the ends of the screws bear against the shoulders $i$ when the drums are down. The height of the drums above the ground is regulated by turning the screws $h$ up or down. By screwing them down the elevation of the drums is increased, and vice versa.

The lever $m\,n$, for raising and lowering the frame carrying the drums, is double. It is attached to the frame $b$, and one end, $m$, has a rest for the foot, accessible to the driver, while the other end, $n$, is brought up toward the front, convenient to his hand. When the drums are to be only temporarily raised for the purpose of passing an obstruction the handle $n$ is used; but when it is desired to fasten the frame $b$ up the lever $m$ is pressed down with the foot until the handle $n$ catches under the hook $p$.

Each drum is formed of two heads, $r$, secured to the shaft, and several flat spiral blades or hoes, $t$. On the inside of each head there are slides $v$, which receive the ends of the blades $t$, and by drawing out or pushing in the blades the diameter of the drums can be increased or diminished. The length of each drum is equal to the distance between the cotton-plants that are to be left standing, and the spaces between the drums are such that the desired number of cotton-plants will be passed untouched.

Having thus described my invention, what I claim as my own, and desire to secure by Letters Patent, is—

The combination, with the sulky-frame having the gears $f$, adjusting-screws $h$, and catch $p$, of the swinging frame $b$, having the shaft $c$, pinions $e$, drums $d$, and levers $m$ and $n$, and the spring $g$, all as described, and for the purpose set forth.

In testimony that I claim the foregoing as my own I affix my signature in presence of two witnesses.

J. C. LEE.

Witnesses:
N. R. BARNES,
A. J. ROBERTS.